United States Patent
Perruchot et al.

(10) Patent No.: US 12,009,902 B2
(45) Date of Patent: Jun. 11, 2024

(54) METHOD FOR EXCHANGING DATA BETWEEN DRONES OF A DRONE SWARM

(71) Applicant: THALES, Courbevoie (FR)

(72) Inventors: Ludovic Perruchot, Élancourt (FR); Philippe Antier, Élancourt (FR); Vincent Ligeret, Élancourt (FR); Jérôme Achart, Élancourt (FR)

(73) Assignee: THALES, Courbevoie (FR)

( * ) Notice: Subject to any disclaimer, the term of this patent is extended or adjusted under 35 U.S.C. 154(b) by 518 days.

(21) Appl. No.: 17/294,838

(22) PCT Filed: Nov. 22, 2019

(86) PCT No.: PCT/EP2019/082284
§ 371 (c)(1),
(2) Date: May 18, 2021

(87) PCT Pub. No.: WO2020/104677
PCT Pub. Date: May 28, 2020

(65) Prior Publication Data
US 2022/0021440 A1    Jan. 20, 2022

(30) Foreign Application Priority Data

Nov. 23, 2018 (FR) ...................... 1871758

(51) Int. Cl.
| | |
|---|---|
| *H04B 7/14* | (2006.01) |
| *H04B 7/185* | (2006.01) |
| *H04L 67/12* | (2022.01) |
| *H04W 64/00* | (2009.01) |

(52) U.S. Cl.
CPC ......... *H04B 7/18506* (2013.01); *H04L 67/12* (2013.01); *H04W 64/00* (2013.01)

(58) Field of Classification Search
CPC .................................................. H04B 7/18502
See application file for complete search history.

(56) References Cited

U.S. PATENT DOCUMENTS

| | | | |
|---|---|---|---|
| 9,104,201 B1* | 8/2015 | Pillai ....................... | H04L 67/12 |
| 2016/0026179 A1 | 1/2016 | Humenay | |
| 2016/0114487 A1 | 4/2016 | Lacaze et al. | |
| 2017/0053169 A1* | 2/2017 | Cuban .................... | G05D 1/104 |

(Continued)

OTHER PUBLICATIONS

French Search Report, from the French Patent Office in counterpart French Application No. 1871758, dated Sep. 19, 2019.

(Continued)

*Primary Examiner* — Shantell L Heiber
(74) *Attorney, Agent, or Firm* — ArentFox Schiff LLP

(57) ABSTRACT

The present invention relates to a method for exchanging data between drones of a drone swarm comprising at least four drones, the method comprising:
emitting, by each drone, a signal comprising data to be emitted comprising the identifier of the drone, the direction and the identifier of each signal received at the preceding moment by the drone,
receiving, by a drone, called receiver drone, the signal emitted by another drone of the swarm,
determining, by the receiver drone, the direction of each received signal, and
determining, by the receiver drone, for each received signal, the relative position of the drone corresponding to the identifier of the received signal.

13 Claims, 3 Drawing Sheets

(56) References Cited

U.S. PATENT DOCUMENTS

Figure 1:
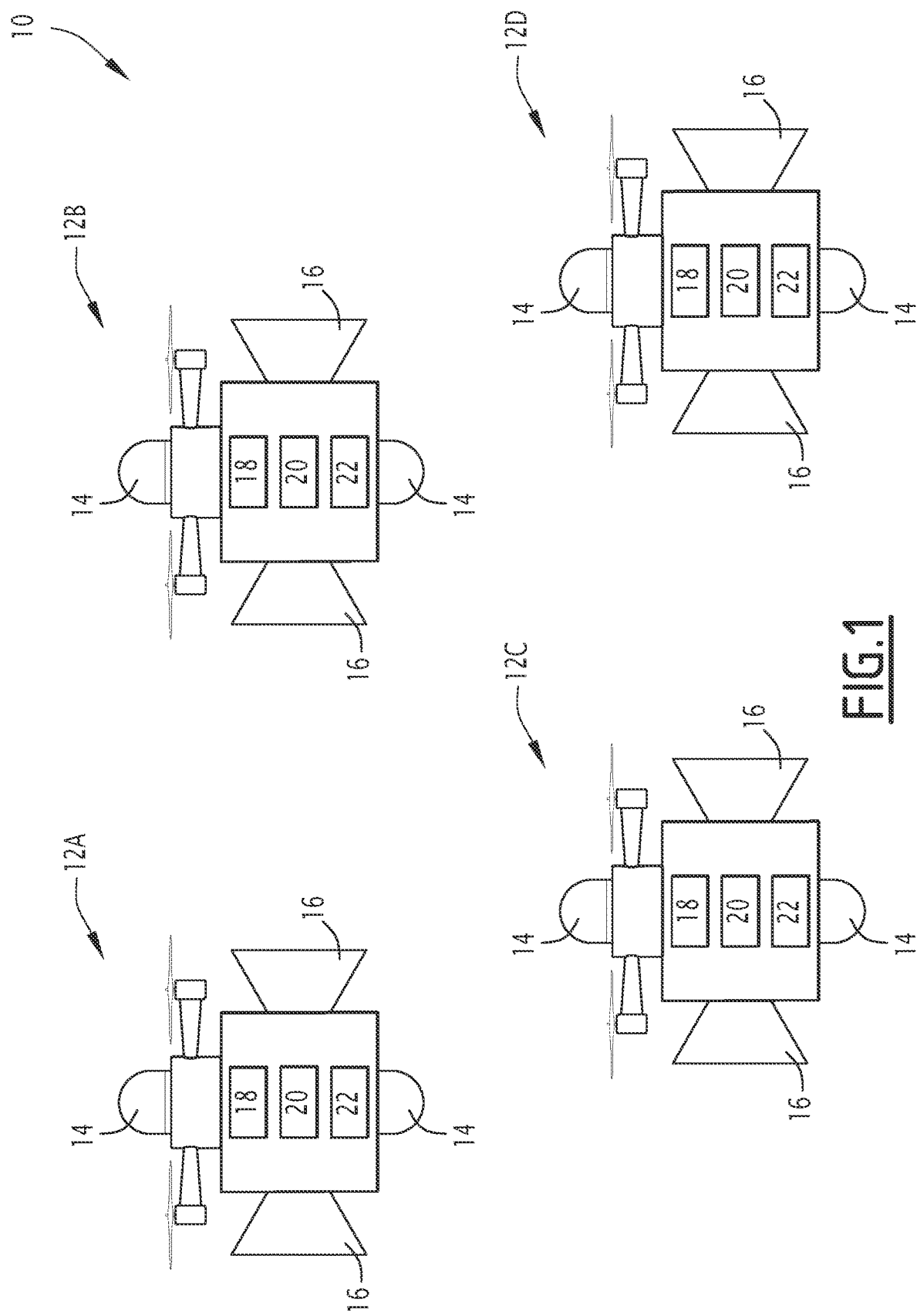

2020/0034620 A1* 1/2020 Lutterodt ............... G01C 11/28
2020/0134311 A1* 4/2020 Pojman ................ G06V 30/422

OTHER PUBLICATIONS

International Search Report, issued by International Searching Authority in corresponding International Application No. PCT/EP2019/082284, dated Jan. 13, 2020.

* cited by examiner

METHOD FOR EXCHANGING DATA BETWEEN DRONES OF A DRONE SWARM

CROSS-REFERENCE TO RELATED APPLICATIONS

This application is a National Stage Entry of International Patent Application No. PCT/EP2019/082284, filed on Nov. 22, 2019, which claims priority to French Application No. 18 71758, filed on Nov. 23, 2018. The disclosures of the priority applications are incorporated in their entirety herein by reference.

The present invention relates to a method for exchanging data between drones of a drone swarm. The present invention also relates to a drone swarm suitable for implementing such a data exchange method.

A drone swarm, also called a drone network, refers to a set of drones flying in close proximity to each other. In order to communicate with each other, the drones of such a swarm are conventionally provided with radio frequency communication devices. In addition, such drones are generally equipped with GPS (Global Positioning System) tracking devices allowing them to locate themselves and to transmit their position to the other drones of the swarm.

However, data exchanges via radio frequency communication are susceptible to being scrambled and are therefore not robust enough for critical applications. Similarly, tracking via a GPS tracking device can easily be jammed.

As such, there is a need for a method of data exchange between drones of a drone swarm allowing for the identification and tracking of drones of the swarm that is robust and does not require the addition of a tracking device on each drone.

To this end, the object of the invention is a method for exchanging data between drones of a drone swarm, the drone swarm comprising at least four drones, each drone being provided with an identifier specific to the drone, each drone comprising at least one transmitter, at least one receiver and a computer, each receiver comprising a pixel matrix configured so that each signal is received on a number of pixels of the pixel matrix that is strictly less than the total number of pixels of the pixel matrix, the method comprising, at each moment:
  emitting, by the transmitter of each drone, a signal comprising data to be emitted, the data to be emitted comprising the identifier of the drone, as well as the direction and the identifier of each signal received at the previous moment by the receiver of the drone,
  receiving, by the receiver of at least one drone, called the receiver drone, the signal emitted by at least one other drone of the swarm,
  determining, by the computer of each receiver drone, the direction of each signal received as a function of the position of the pixel or pixels of the pixel matrix receiving the signal, and
  if necessary, determining, by the computer of each receiver drone, for each received signal, the relative position of the drone corresponding to the identifier of the received signal as a function of the direction determined for the received signal and of at least two directions obtained at the previous moment by the receiver of the receiver drone and corresponding to the same identifier as the received signal.

According to other advantageous aspects of the invention, the data exchange method comprises one or more of the following features, considered alone or according to all technically possible combinations:
  the receiver of each drone comprises an event detection sensor, with the pixel matrix being comprised in the event detection sensor;
  at least one of the drones, referred to as a reference drone, is associated with an absolute position, the data to be emitted by the transmitter of the reference drone comprising the absolute position of the reference drone, the method further comprising the determination, by each receiver drone receiving the signal emitted by the reference drone, of the absolute position of each drone for which a relative position has been determined by the receiver drone as a function of the absolute position of the reference drone and of the relative positions determined by the receiver drone;
  the or at least one of the reference drones is stationary on the ground;
  the or at least one of the reference drones is carrying an absolute tracking system;
  at least one of the drones of the swarm comprises a sensor configured to detect the presence of objects in the field of the sensor, the method comprising, at each moment, for the drone:
    detecting objects in the field of the sensor, and
    for each detected object, classifying the object as being foreign to the drone swarm when no signal is received from the object or when the received signal for the object does not comprise the identifier of a drone in the swarm;
  each transmitter is a wide field transmitter;
  each transmitter is configured to transmit signals over a solid angle of at least $2\pi$ steradians, each drone preferably comprising at least two diametrically opposed transmitters so as to transmit signals over a solid angle of $4\pi$ steradians;
  the transmitter of each drone is a laser transmitter, preferably in the wavelength range of between 0.7 micrometer and 1.6 micrometer;
  each receiver is a wide field receiver.

The invention further relates to a drone swarm comprising at least four drones, each drone being provided with an identifier specific to the drone, each drone comprising at least one transmitter, at least one receiver and a computer, each receiver comprising a pixel matrix configured so that each signal is received on a number of pixels of the pixel matrix strictly less than the total number of pixels of the pixel matrix, the drone swarm being suitable for implementing a data exchange method as described above.

Further features and advantages of the invention will become apparent from the following description of embodiments of the invention, given by way of example only and with reference to the drawings, which are:
  FIG. 1 a schematic representation of a drone swarm,
  FIG. 2 a schematic representation of the drone swarm of FIG. 1 in a data exchange situation and in which the pixel matrix corresponding to the receiver of each drone is also represented, and
  FIG. 3, a flow chart of an example of implementation of a data exchange method according to the invention.

Figure 2:
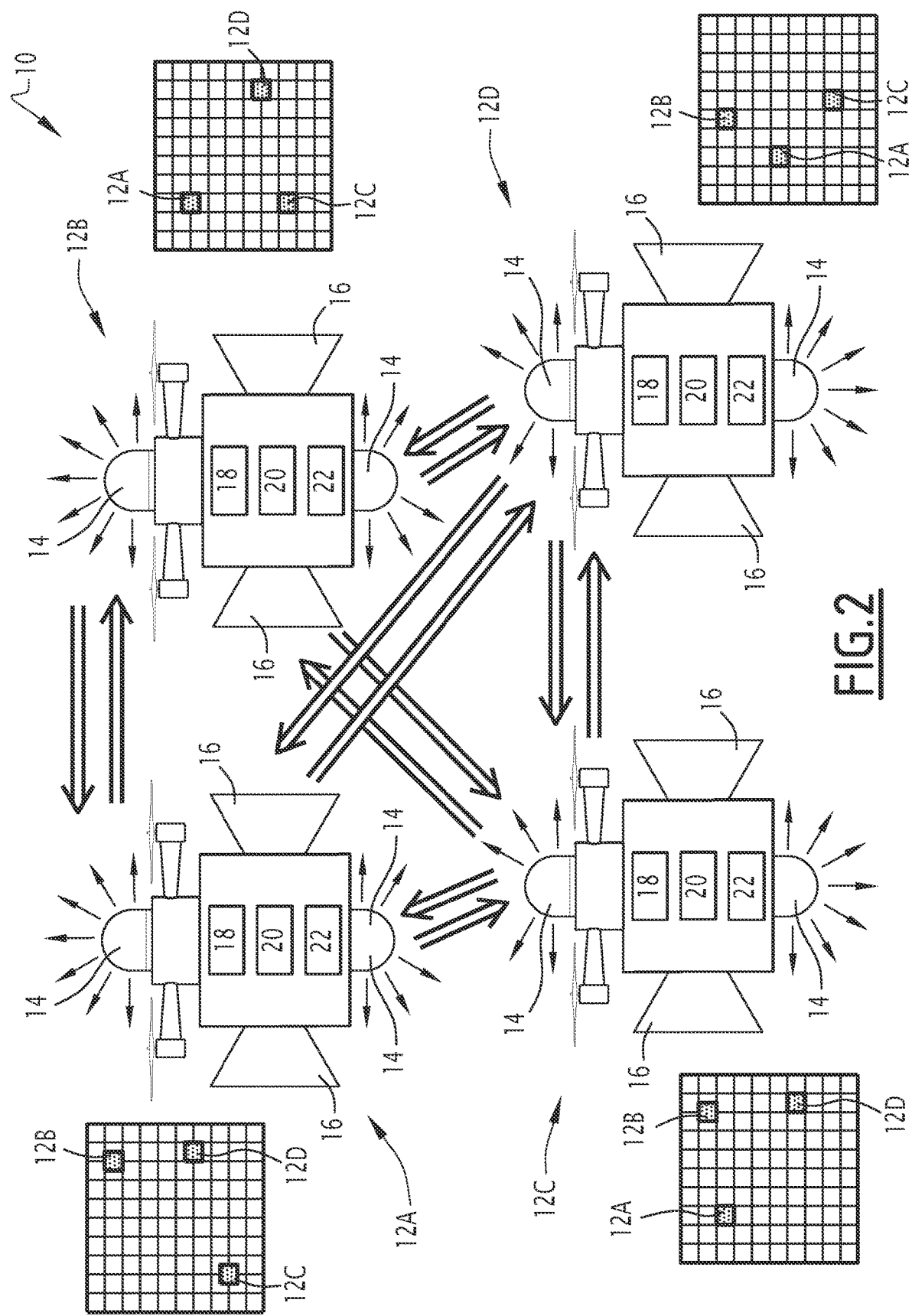

A drone swarm 10 comprising a plurality of drones 12 is illustrated in FIGS. 1 and 2. A drone is an unmanned aircraft without a human on board that is typically remotely controlled.

In particular, the swarm 10 of drones 12 illustrated by FIGS. 1 and 2 comprises four drones 12A, 12B, 12C, 12D. In a variant, the swarm 10 of drones 12 comprises a number of drones 12 strictly greater than four.

Each drone 12 is provided with an identifier specific to the drone 12. By way of example, an identifier is a number specific to the drone 12 and which differs from one drone 12 of the swarm 10 to another.

Advantageously, at least one of the drones 12, called a reference drone, is associated with an absolute position. In this case, the absolute position of the reference drone is, for example, stored in a memory of the reference drone. For example, the reference drone is stationary on a fixed surface, such as the ground.

In a variant, the reference drone carries an absolute tracking system.

For example, the reference drone is equipped with a tracking system, such as a star finder type system, which allows the position of the reference drone to be located at each moment.

Each drone 12 comprises at least one transmitter 14, at least one receiver 16, a computer 18, and a memory 20. Optionally, at least one of the drones 12 in the swarm 10 comprises a sensor 22.

Each transmitter 14 is preferably a wide field transmitter. A wide-field transmitter is defined as a transmitter configured to transmit a signal over a solid angle strictly greater than 10° by 10°. As such, a wide field transmitter allows a signal to be emitted in a plurality of directions around the drone 12.

Preferably, each transmitter 14 is configured to transmit signals over a solid angle of at least 2π steradians (hemispheres). In the example shown in FIGS. 1 and 2, each drone 12 comprises at least two diametrically opposed transmitters 14 so as to transmit signals over a solid angle of 4π steradians (sphere) around the drone 12.

The transmitter 14 of each drone 12 is configured to transmit an optical signal. As such, the transmitter 14 of each drone 12 does not transmit any radio frequency signal.

Advantageously, the transmitter 14 of each drone 12 is a laser transmitter. The wavelength range of the laser transmitter is, for example, between 0.7 micrometers (μm) and 1.6 micrometers.

The receiver 16 of each drone 12 is a wide field receiver. A wide field receiver is defined as a receiver configured to receive a signal over a solid angle strictly greater than 10° by 10°. As such, a wide field receiver allows signals to be received from a plurality of directions around the drone 12.

For example, each wide field receiver is configured to receive signals over a solid angle of at least 90° by 120°.

Preferably, each drone 12 comprises at least four receivers 14 that are orthogonal to a single plane and offset by 90°. As such, this allows for coverage of signals from all four cardinal points around the drone 12.

Each receiver 16 comprises a pixel matrix 23 configured so that each signal is received on a number of pixels of the pixel matrix 23 that is strictly less than the total number of pixels of the pixel matrix 23. Typically, each pixel in the array is associated with a direction. As such, this allows for determination of the direction of each signal received by the pixel matrix 23.

Preferably, each receiver 16 comprises an event detection sensor, with the pixel matrix 23 being comprised in the event detection sensor. An event detection sensor is a sensor comprising a pixel matrix whose pixels are autonomous and capable of reacting independently of each other with a response time generally in the order of microseconds. An event detection sensor is capable of capturing and emitting only the changes in events and not the entire scene, as is the case with traditional image sensors. As such, compared to a traditional image sensor, an event detection sensor has reduced latency, data volume to be processed and power consumption. In addition, an event detection sensor has a high bandwidth, typically greater than 1 megabit per second.

The computer 18 is, for example, a processor.

The sensor 22 is configured to detect the presence of objects in the field of the sensor 22. Such objects are, advantageously, electronic objects. For example, such objects are the other drones 12 in the swarm 10, drones not belonging to the swarm, or aircraft.

Figure 3:
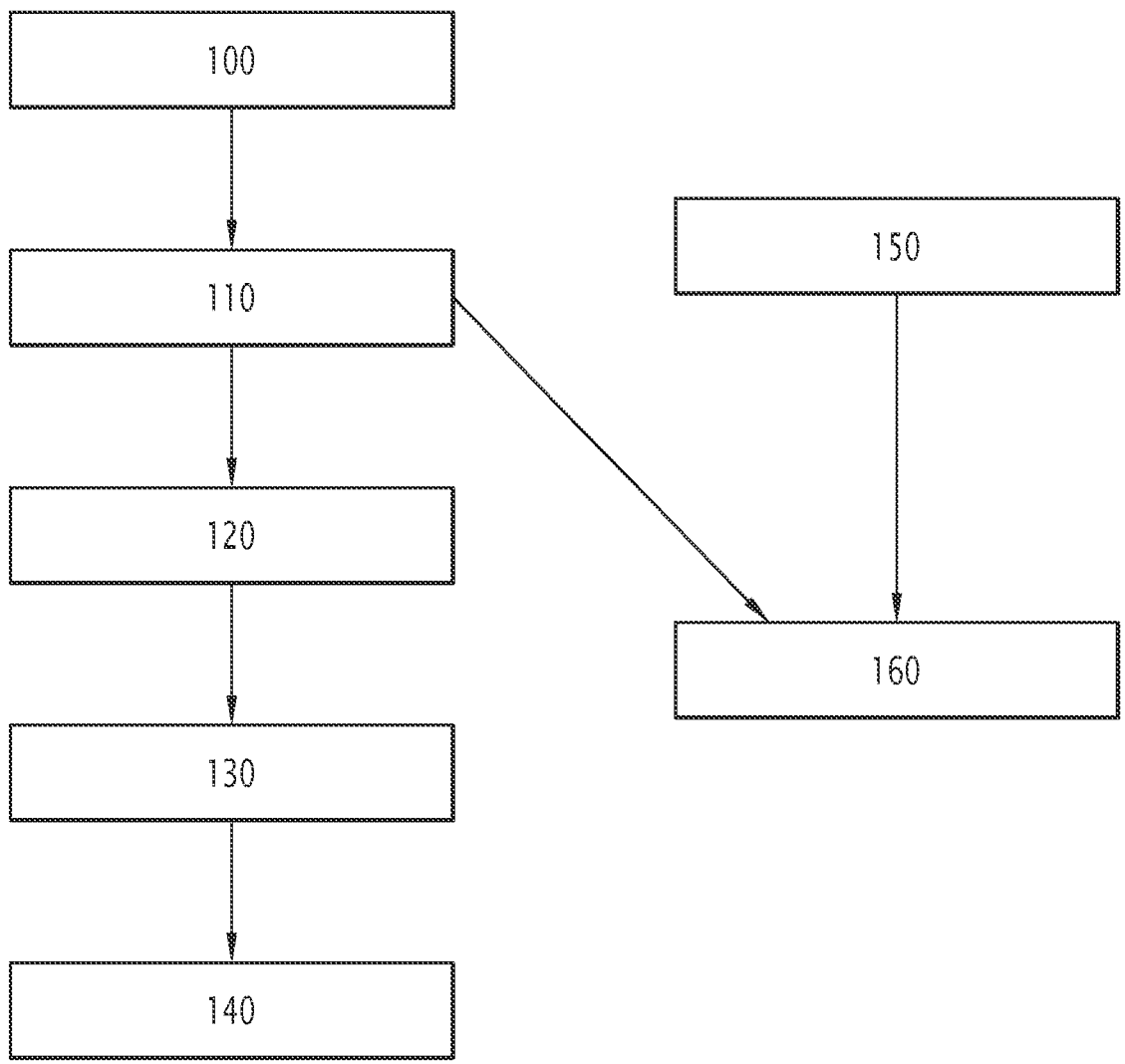

The operation of the swarm 10 of drones 12 of FIG. 1 is now described with reference to FIGS. 2 and 3, which illustrate an example of implementation of a data exchange process according to the invention. The steps of such a process are implemented at each moment, i.e., in real time.

The data exchange method comprises a step 100 of transmission by the transmitter 14 of each drone 12 of a signal comprising data to be emitted. The data to be emitted comprises the identifier of the drone 12, as well as the direction and identifier of each signal received at the previous moment by the receiver 16 of the drone 12. Such signals received at the previous moment are signals from other drones 12 in the swarm 10. Advantageously, the signal comprising the data to be emitted also comprises data useful for communication between drones, such as instructions from one drone to another.

When at least one of the drones 12, known as the reference drone, is associated with an absolute position, the data to be emitted by the transmitter 14 of the reference drone also comprises the absolute position of the reference drone.

The direction and the identifier of each signal received by each drone 12 at the previous moment are, for example, stored in the memory 20 of the drone 12. The memory 20 of each drone 12 is updated at each moment, as will be described below.

As such, when initializing a drone 12, the data to be emitted comprises only the identifier of the drone 12, since the drone 12 has not received a signal at the preceding moment. When initializing a reference drone, the data to be emitted comprises only the identifier of the reference drone and the absolute position of the reference drone, since the reference drone has not received a signal at the preceding moment.

In the example shown in FIG. 2, each of the four drones 12A, 12B, 12C, and 12D in the swarm 10 transmits a signal to the other drones 12 in the swarm 10.

The data exchange method comprises a step 110 of receiving, by the receiver 16 of at least one drone 12, called the receiver drone, the signal emitted by at least one other drone 12 of the swarm 10.

In the example illustrated in FIG. 2, each of the four drones 12A to 12D of the swarm 10 receives a signal from each of the other three drones 12 of the swarm 10. Indeed, in the example illustrated in FIG. 2, no element, such as a building or vegetation, masks the signals emitted by the various drones 12 of the swarm 10. As such, in this example, each drone 12 of the swarm 10 is a receiver drone.

In contrast, if, for example, drone 12D were masked by a building, the other drones 12A through 12C would not receive signals from drone 12D and drone 12D would not receive signals from the other drones 12A through 12C.

The data exchange method comprises a step 120 of determining the direction, by the computer 18 of each receiver drone, of each received signal as a function of the position of the pixel or pixels of the pixel matrix 23 receiving the signal. Indeed, each pixel of the pixel matrix 23 being associated with a direction (in real space), the direction of each received signal is determined as a function of the position, in the pixel matrix 23, of the pixel or pixels receiving the signal.

In general, a received signal at the top left, to the right respectively, of the pixel matrix will be considered as coming from a drone to the left, respectively right, of the receiver drone and at a height greater than or equal to that of the receiver drone. A signal received at the bottom left, respectively right, of the pixel matrix will be considered as coming from a drone to the left, respectively right, of the receiver drone and at a height lower than or equal to that of the receiver drone. For example, for drone 12A shown in FIG. 2, the signal from drone 12B is located at the top right of the pixel matrix 23 of the receiver 16 of drone 12A. The signal from drone 12C is located at the bottom left of the pixel matrix 23 of the receiver 16 of drone 12A, and the received signal from drone 12D is located at the bottom right of the pixel matrix 23 of the receiver 16 of drone 12A.

The direction is determined, for example, in terms of elevation angle and bearing angle. The bearing angle is the angle formed between the longitudinal axis of the receiver drone and the direction of the received signal. The elevation angle, also known as the site angle, is the angle formed between the horizontal plane of the receiver drone and the direction of the received signal.

The data exchange method comprises a step 130 of determining, by the computer 18 of each receiver drone, for each received signal, the relative position of the drone 12 corresponding to the identifier of the received signal.

The relative position of the corresponding drone 12 is determined as a function of the direction determined for the received signal and at least two directions obtained at the previous moment by the receiver 16 of the drone 12 and corresponding to the same identifier as the received signal. As such, a relative position is obtained at the determination step 130 only when the memory 20 of the receiver drone comprises the direction of two signals having the same identifier as the received signal.

More specifically, the relative position of the drones 12 corresponding to each received signal is determined by triangulation. Triangulation is a method of determining the position of a point by measuring the angles between the point and other reference points whose position is known, and this rather than directly measuring the distance between the points. Such a point can be thought of as the third vertex of a triangle where two angles and the length of one side are known.

Upon completion of the determination step 130, the memory 20 of each drone 12 is, also, updated by replacing the directions and identifiers stored in the memory 20 with the direction determined for each received signal associated with the identifier of the drone 12 comprised in the data of each received signal.

When at least one of the drones 12, referred to as a reference drone, is associated with an absolute position, the exchange method comprises a step of determining 140, by the reference drone, and by each receiver drone receiving the signal emitted by the reference drone, the absolute position of each drone 12 for which a relative position has been determined by the receiver drone.

The absolute position of the drone 12 corresponding to the identifier of each received signal is determined as a function of the absolute position of the reference drone and the relative positions determined in the determination step 130.

With the matrices providing the site and bearing of the drones seen, the relative position of each drone is deduced in 3 dimensions and absolutely, if one of the drones is referenced absolutely.

Advantageously, for each drone 12 of the swarm 10 comprising a sensor 22 configured to detect the presence of objects in the field of the sensor 22, the data exchange method further comprises a step 150 of detecting objects in the field of the sensor 22. The detection step 150 occurs, for example, at the same time as the receiving step 110.

For each detected object, the data exchange method comprises a step 160 of classifying the object as foreign to the swarm 10 of drones 12 when no signal is received from the object or when the signal received for the object does not comprise the identifier of a drone 12 in the swarm 10. Otherwise, the object is considered to be a drone 12 belonging to the swarm 10 of drones 12.

Advantageously, when an object is classified as foreign to the swarm 10 of drones 12, an alarm is sent to a user piloting or monitoring the drone 12 remotely.

As such, the data exchange method allows for the identification and tracking, by each drone in a swarm, of other drones in the swarm located in the drone's immediate environment. More generally, the data exchange method allows for communication between drones in a swarm.

The method also makes it possible to avoid the use of radio frequency waves and is therefore more robust to jamming. It also has the advantage of not requiring a GPS tracking device.

The invention claimed is:

1. A method for exchanging data between drones of a swarm of drones, the swarm of drones comprising at least four drones, each drone being provided with an identifier specific to the drone, each drone comprising at least one transmitter, at least one receiver and a computer, each receiver comprising a pixel matrix configured so that each signal is received on a number of pixels of the pixel matrix that is strictly less than a total number of pixels of the pixel matrix, the method comprising, at each moment:

emitting, by the transmitter of each drone, a signal comprising data to be emitted, the data to be emitted comprising the identifier of the drone, as well as a direction and the identifier of each signal received at a preceding moment by the receiver of the drone, receiving, by the receiver of at least one drone, called the receiver drone, the signal emitted by at least one other drone of the swarm, determining, by the computer of each receiver drone, the direction of each signal received as a function of a position of the pixel or pixels of the pixel matrix receiving the signal, and determining, by the computer of each receiver drone, for each received signal, a relative position of the drone corresponding to the identifier of the received signal as a function of the direction determined for the received signal and of at least two directions obtained at the preceding moment by the receiver of the receiver drone and corresponding to a same identifier as the received signal.

2. The method according to claim 1, wherein the receiver of each drone comprises an event detection sensor, the pixel matrix being comprised in the event detection sensor.

3. A method according to claim 1, wherein at least one of the drones, referred to as a reference drones, is associated with an absolute position, the data to be emitted by the transmitter of the reference drone comprising the absolute position of the reference drone, the method further comprising the determination, by each receiver drone receiving the signal emitted by the reference drone, of the absolute position of each drone for which a relative position has been determined by the receiver drone as a function of the absolute position of the reference drone and the relative positions determined by the receiver drone.

4. The method according to claim 3, wherein the or at least one of the reference drones is stationary on a ground.

5. The method according to claim 3, wherein the or at least one of the reference drones carries an absolute location system.

6. The method according to claim 1, wherein at least one of the drones of the swarm comprises a sensor configured to detect a presence of objects in a field of the sensor, the method comprising, at each moment, for the drone:
    detecting objects in the field of the sensor, and
    for each detected object, classifying the object as foreign to the swarm of drones when no signal is received from the object or when the signal received for the object does not comprise the identifier of a drone in the swarm.

7. The method according to claim 1, wherein each transmitter is a wide field transmitter.

8. The method according to claim 7, wherein each transmitter is configured to transmit signals over a solid angle of at least $2\pi$ steradians.

9. The method according to claim 8, wherein each drone comprises at least two diametrically opposed transmitters so as to transmit signals over a solid angle of $4\pi$ steradians.

10. The method according to claim 1, wherein the transmitter of each drone is a laser transmitter.

11. The method according to claim 10, wherein the laser transmitter of each drone is in a wavelength range of between 0.7 micrometers and 1.6 micrometers.

12. The method according to claim 1, wherein each receiver is a wide field receiver.

13. A drone swarm comprising at least four drones, each drone being provided with an identifier unique to the drone, each drone comprising at least one transmitter, at least one receiver and a computer, each receiver comprising a pixel matrix configured so that each signal is received on a number of pixels of the pixel matrix that is strictly less than the total number of pixels of the pixel matrix, the swarm of drones being suitable for implementing a data exchange method according to claim 1.

* * * * *